United States Patent [19]

Haines, Jr. et al.

[11] 4,397,894
[45] Aug. 9, 1983

[54] VINYL FACED WALLBOARD

[75] Inventors: Charles Haines, Jr.; Raymond C. Kent, both of Lancaster, Pa.

[73] Assignee: Armstrong World Industries, Inc., Lancaster, Pa.

[21] Appl. No.: 360,786

[22] Filed: Mar. 22, 1982

[51] Int. Cl.³ .............................................. B32B 3/10
[52] U.S. Cl. .................................. 428/138; 181/293; 181/294; 428/218; 428/511
[58] Field of Search ............... 428/131, 137, 138, 172, 428/188, 218, 282, 511, 300, 234; 181/293, 294, 292

[56]   References Cited
U.S. PATENT DOCUMENTS

| 2,984,312 | 5/1961 | Brisley et al. ....................... 181/292 |
| 3,712,846 | 1/1973 | Daniels et al. ...................... 428/138 |
| 3,844,875 | 10/1974 | Chamberlain ....................... 428/138 |
| 3,924,040 | 12/1975 | Addie et al. ........................ 428/172 |
| 3,979,254 | 9/1976 | McIntyre ............................ 162/342 |
| 4,153,503 | 5/1979 | Booth et al. ........................ 162/123 |

Primary Examiner—James J. Bell

[57]   ABSTRACT

The invention is directed to a wallboard structure which is first composed of a base sheet having a dense upper surface region. Over the dense surface region there is placed a vinyl sheet. Perforations are placed through the vinyl sheet and through the dense surface region and partly into the base region so there is formed an acoustical vinyl faced wallboard.

6 Claims, 1 Drawing Figure

U.S. Patent     Aug. 9, 1983     4,397,894
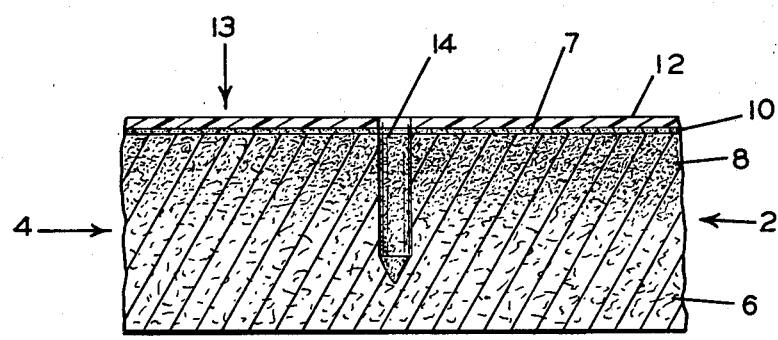

VINYL FACED WALLBOARD

BACKGROUND OF THE INVENTION

1. Field of the Invention

The invention is directed to a wallboard and, more particularly, to a perforated wallboard with a vinyl facing.

2. Description of the Prior Art

U.S. Pat. No. 3,844,875 is directed to a vinyl covered board structure for ceilings which has perforations extending through the vinyl covering into the base structure.

U.S. Pat. No. 3,924,040 is directed to a wallboard structure which has a fabric covering thereover.

U.S. Pat. No. 2,984,312 is directed to the use of a tough surfacing sheet with perforations therein. An intermediate layer under the surfacing sheet is of higher density then the base sheet. It is noted that the surfacing sheet is impregnated with a fire retardant material having high fire resistant properties.

SUMMARY OF THE INVENTION

The invention is directed to a wallboard which has a base sheet composed of two regions. The upper region is of a density greater than the lower region. A vinyl sheet is positioned on the surface of the denser region and fastened thereto. Small perforations extend through the vinyl sheet, the denser upper surface of the base sheet, and partly into the less dense lower surface of the base sheet.

BRIEF DESCRIPTION OF THE DRAWING

The drawing is a cross-sectional view of the vinyl faced wallboard invention.

DESCRIPTION OF THE PREFERRED EMBODIMENT

The wallboard 2 of the invention herein is composed of a base sheet 4 which is composed of two regions 6 and 8. The upper region 8 is of a greater density than the lower region 6. The density of the upper region 8 is about 2.40 pounds per board foot while the density of the lower regin is about 2.00 pounds per board foot. The upper region 8 is approximately 33% of the total thickness of the base sheet 4. An adhesive coating 10 is provided on the upper surface 7 of the base sheet 4 and then placed over top of this is a vinyl sheet 12 which is now adhesively bonded by the adhesive 10 to the base sheet 4. Perforations are provided in the structure and perforation 14 is typical of the perforations provided. The perforation 14 extends through the vinyl sheet 12, the upper denser region 8 and down into the lower less dense region 6. The punch pin which forms the perforation is a standard acoustical pin and it has a pointed end. This provides a structure which is quite good for absorbing sound which is reflected against the surface 13 of the wallboard structure 2.

The base sheet 2 is a conventional mineral fiber board structure such as that which is produced by the technique taught in U.S. Pat. No. 3,979,254. The board is produced on conventional fourdrinier equipment with the lower less dense region being formed on the fourdrinier wire and then the higher density upper region 8 being a layer deposited thereon so that when the product is completely formed and dried there results a conventional mineral board structure. U.S. Pat. No. 4,153,503 which is mentioned in U.S. Pat. No. 3,979,254 discloses a typical board formulation having a low density base and a higher density upper layer and the disclosure of both the aforesaid patents is incorporated herein by reference.

It is also possible to form a board with two regions of different densities without providing two separate layers. By using a higher level of starch and mineral wood over that normally used, there is a density gradient in the board structure. This gradient results from a settling of the board components on the fourdrinier wire so that the lower ⅔ of the board has a density of 2.40 pounds per board foot as compared to a density of 2.00 pounds per board foot for the rest of the board. After fabrication the board is turned over and the denser bottom surface is made the top surface in the product described herein.

The above base sheet 2 is formulated with two different regions 6 and 8 with the upper region having a density of 2.40 pounds per board foot and the lower region 6 having a density of 2.0 pounds per board foot. The upper region or layer is 33% of the thickness of the finished board product, and the finished board product has a total thickness of about three-quarters of a inch.

Normally, the upper surface 7 of the board, which is the exposed surface of the upper region 8, is provided with a conventional latex paint coat. Over top of this, there is provided an adhesive coating which covers the total surface of the board structure. A particularly good adhesive to use is the Franklin F114 adhesive produced by the Franklin Chemical Company. To this adhesive is then fastened a commercial vinyl material. This vinyl material could be the vinyl material of U.S. Pat. No. 3,844,875 or it could be 20 mils of commercial textured vinyl produced by the Columbus Coated Fabrics Division of Borden Chemical Company. This vinyl layer 12 is adhesively bonded by the adhesive coating 10 to the upper part of upper denser region 8 of the base sheet 2.

The upper layer 8 can be fabricated with aluminum trihydrate incorporated into the structure of this region. About 15% by weight of the upper region will be the aluminum-trihydrate which will function as a fire retardant agent for the surface of the board structure. It is also possible to provide the fire retardant agent in the vinyl layer, but this will substantially increase the cost of the product, and it is also possible to incorporate the fire retardant layer in the paint coat or adhesive coating 10 which is applied to the board structure.

After the product is formed, it is provided with a plurality of perforations which extend through the vinyl sheet, and the upper region 8, and part way into the lower region 6. The perforations are formed by using 0.075 mil diameter pin punches. These perforations are provided at a density of about 15 perforations per square inch. The perforations are necessary to give the product the desired acoustical rating.

What is claimed is:

1. A wallboard comprising:
   (a) a base sheet composed of two regions, the upper region being of a greater density than the lower region
   (b) a vinyl sheet positioned over the surface of the denser region and fastened thereto, and
   (c) small perforations extending through the vinyl sheet, the denser upper region of the base sheet and partly into the less dense lower region of the base sheet.

2. The wallboard panel of claim 1 wherein the base sheet is a mineral fiber board and has a density of about 2.40 pounds per board foot for the upper region and a density of 2.00 pounds per board foot for the lower region.

3. The wallboard panel of claim 2 wherein the denser upper region is 33% of the overall thickness of the board.

4. The wall panel of claim 1 wherein the perforations are approximately 0.075 mils in diameter.

5. A wall panel set forth in claim 1 wherein the vinyl sheet is 20 mils thick.

6. A wall panel set forth in claim 1 wherein the perforations which extend through the vinyl sheet, the denser upper layer and the less denser lower region are all of the same diameter and are in register one above the other.

* * * * *